(12) United States Patent
Zhao

(10) Patent No.: US 11,876,861 B2
(45) Date of Patent: Jan. 16, 2024

(54) DATA MANAGEMENT METHOD, DATA MANAGEMENT DEVICE, BLOCKCHAIN NETWORK AND SYSTEM

(71) Applicants: BEIJING BOE TECHNOLOGY DEVELOPMENT CO., LTD., Beijing (CN); BOE TECHNOLOGY GROUP CO., LTD., Beijing (CN)

(72) Inventor: Junjie Zhao, Beijing (CN)

(73) Assignees: BEIJING BOE TECHNOLOGY DEVELOPMENT CO., LTD., Beijing (CN); BOE TECHNOLOGY GROUP CO., LTD. CHINA, Beijing (CN)

( * ) Notice: Subject to any disclaimer, the term of this patent is extended or adjusted under 35 U.S.C. 154(b) by 0 days.

(21) Appl. No.: 18/022,797

(22) PCT Filed: Aug. 24, 2021

(86) PCT No.: PCT/CN2021/114205
§ 371 (c)(1),
(2) Date: Feb. 23, 2023

(87) PCT Pub. No.: WO2022/042517
PCT Pub. Date: Mar. 3, 2022

(65) Prior Publication Data
US 2023/0319138 A1  Oct. 5, 2023

(30) Foreign Application Priority Data
Aug. 28, 2020 (CN) .......................... 202010885515.X

(51) Int. Cl.
*G06F 15/16* (2006.01)
*H04L 67/1097* (2022.01)
*G06F 16/23* (2019.01)

(52) U.S. Cl.
CPC ...... *H04L 67/1097* (2013.01); *G06F 16/2379* (2019.01)

(58) Field of Classification Search
CPC .................. H04L 67/1097; G06F 16/2379
(Continued)

(56) References Cited

U.S. PATENT DOCUMENTS

| 10,528,551 B2 * | 1/2020 | Li ........................ H04L 67/1097 |
| 10,762,079 B2 * | 9/2020 | Shi .......................... H04L 9/0637 |

(Continued)

FOREIGN PATENT DOCUMENTS

| CN | 109257412 A | 1/2019 |
| CN | 110035081 A | 7/2019 |

(Continued)

OTHER PUBLICATIONS

Gong Yuxia, Lyu Jiake, "Design of a Data Storage System Based on Blockchain," Journal of Chongqing University of Technology ( Natural Science), 2019, vol. 33, Issue 9 pp. 190-195.

(Continued)

*Primary Examiner* — Alicia Baturay
(74) *Attorney, Agent, or Firm* — Dilworth & Barrese, LLP; Michael J. Musella, Esq.

(57) ABSTRACT

A data management method based on blockchain, a device, a blockchain network, and a system are provided. The data management method is applied to a plurality of blockchain network nodes, and includes: creating a data subscription contract, where the data subscription contract is configured for subscribing to a data provider; receiving a data acquisition request which includes data identification information of requested data; executing the data subscription contract to subscribe to the data provider for the requested data in the case where the requested data does not exist in the blockchain network; and receiving a transaction request including (Continued)

the requested data from the data provider, and writing the requested data into the blockchain network after passing a verification of the requested data.

20 Claims, 8 Drawing Sheets

(58) Field of Classification Search
USPC .......................................................... 709/217
See application file for complete search history.

(56) References Cited

U.S. PATENT DOCUMENTS

| | | | |
|---|---|---|---|
| 10,956,204 B1* | 3/2021 | Behl | G06F 16/2365 |
| 11,070,495 B2* | 7/2021 | Shah | G06N 20/00 |
| 11,544,254 B2* | 1/2023 | Shi | H04L 67/565 |
| 11,556,521 B2* | 1/2023 | Little | G06Q 20/389 |
| 11,636,095 B2* | 4/2023 | Li | G06F 16/27 |
| | | | 719/313 |
| 11,722,563 B2* | 8/2023 | Natanzon | G06F 11/1658 |
| | | | 709/217 |
| 2019/0207768 A1 | 7/2019 | Hardy et al. | |
| 2020/0151784 A1* | 5/2020 | Kar | G06Q 30/0609 |
| 2021/0091994 A1* | 3/2021 | Meirosu | H04L 41/5006 |
| 2022/0335417 A1* | 10/2022 | Regenor | G06Q 20/3678 |
| 2022/0351165 A1* | 11/2022 | Regenor | G06F 21/64 |
| 2023/0018133 A1* | 1/2023 | Burnette | G06Q 20/389 |

FOREIGN PATENT DOCUMENTS

| | | |
|---|---|---|
| CN | 110113381 A | 8/2019 |
| CN | 110191188 A | 8/2019 |
| CN | 110597922 A | 12/2019 |
| CN | 111090385 A | 5/2020 |
| WO | WO-2020192567 A1 * 10/2020 | ........... G06F 21/602 |

OTHER PUBLICATIONS

Hao Feiyang, "Design and Implementation of Multi-domain IoT Data Sharing Exchanging Management Platform," China Excellent Master's Thesis Full Text Database (Electronic Journal), Issue 2, 2020 pp. 13-49.

* cited by examiner

DATA MANAGEMENT METHOD, DATA MANAGEMENT DEVICE, BLOCKCHAIN NETWORK AND SYSTEM

CROSS-REFERENCE TO RELATED APPLICATION

The present application claims the priority to Chinese patent application No. 202010885515.X, filed on Aug. 28, 2020, the entire disclosure of which is incorporated herein by reference as part of the present application.

TECHNICAL FIELD

The present application relates to the technical field of data management, and more particularly, to a data management method based on blockchain, a data management device, a blockchain network, and a system.

BACKGROUND

With the development of the Internet of Things, more and more equipment are connected to the Internet of Things (IoT) system. A current general IoT system framework is shown in FIG. 1. The IoT equipment with limited capabilities such as sensors is connected to an IoT platform through an IoT gateway, and the full-featured IoT equipment can be directly connected to the IoT platform or connected to the IoT platform through the IoT gateway. The IoT platform centrally manages various equipment and provides interfaces for upper-layer IoT applications. The IoT applications access data of the equipment and control the equipment through the IoT platform.

Taking smart manufacturing, one of the application fields of the IoT, as an example, a large number of industrial equipment are connected to an industrial internet platform directly or through the IoT gateway, report data in real time, and receive instructions sent by the platform. Manufacturing is a typical asset-heavy enterprise that needs to buy a large number of equipment.

With the development of smart manufacturing, the development model of future enterprises will also change. Manufacturers do not need to purchase a large number of equipment, but can quickly put into production through the model of leasing equipment, and pay usage fees according to the usage of the equipment. Through this leasing model, on the one hand, the enterprise's initial equipment investment and enterprise investment risk can be reduced, so that it can be put into production quickly, and on the other hand, the equipment maintenance cost of the enterprise can be reduced.

In this way, a shared equipment platform is built, and the platform can "share" the surplus casting capacity or production lines (production equipment) of some enterprises online. After the enterprises in need are selected, they can realize the order production online, so as to solve the problems of overcapacity and idle equipment in some foundry enterprises, and insufficient production capacity and a backlog of orders in some enterprises, and it is of great significance to promote manufacturing enterprises (manufacturers) to speed up resource optimization and industrial upgrading.

SUMMARY

According to an aspect of the embodiments of the present disclosure, a data management method based on blockchain is provided. The data management method is applied to a plurality of blockchain network nodes of a blockchain network. The method comprises: creating a data subscription contract, where the data subscription contract is configured for subscribing to a data provider; receiving a data acquisition request, where the data acquisition request comprises data identification information of requested data; executing the data subscription contract to subscribe to the data provider for the requested data in the case where the requested data does not exist in the blockchain network; and receiving a transaction request comprising the requested data from the data provider, and writing the requested data into the blockchain network after passing a verification of the requested data.

In an embodiment, the data subscription contract comprises identification information of the data provider.

In this embodiment, the data management method further comprises: determining a remaining storage amount of the plurality of blockchain network nodes; and in the case where the remaining storage amount of the plurality of blockchain network nodes is greater than a storage threshold, issuing a subscription request to the data provider.

In this embodiment, the data management method further comprises: counting a number of times data at the plurality of blockchain network nodes is acquired; and in the case where the remaining storage amount of the plurality of blockchain network nodes is not greater than the storage threshold, issuing an unsubscription request to a data provider that provides data a number of times which is acquired is less than a reference threshold, or issuing the unsubscription request to a data provider that provides data a number of times which is acquired is fewest.

In this embodiment, the data management method further comprises: receiving a subscription success response or a subscription failure response from the data provider. The subscription success response is returned by the data provider in the case where the requested data is determined to exist based on a subscription request that is received, and the subscription failure response is returned by the data provider in the case where the requested data is determined not to exist based on the subscription request that is received.

In this embodiment, the data acquisition request comprises a data acquisition priority. The data management method further comprises: executing the data subscription contract to create a subscription priority based on the data acquisition priority; and comprising the subscription priority in a subscription request and issuing the subscription request to the data provider, so as to enable the data provider, in the case where the requested data is determined to exist, to determine whether the subscription priority comprised in the subscription request is greater than a priority preset value, and in the case where the subscription priority comprised in the subscription request is determined to be greater than the priority preset value, to return a subscription success response.

In another embodiment, the data subscription contract does not comprise identification information of the data provider.

In this embodiment, the data subscription contract is created, so that sub-contracts of the data subscription contract are generated when the data subscription contract is executed, a target address of each sub-contract points to a data provider corresponding to one blockchain network node, and an amount of the sub-contracts of the data subscription contract is equal to an amount of the blockchain network nodes.

In this embodiment, executing the data subscription contract to subscribe to the data provider for the requested data in the case where the requested data does not exist in the blockchain network comprises: in the case where the requested data does not exist in the blockchain network, executing each sub-contract of the data subscription contract in turn; and for a currently executed sub-contract, issuing a subscription request to a target address of the currently executed sub-contract.

In this embodiment, the data management method further comprises: determining a remaining storage amount of the plurality of blockchain network nodes; and in the case where the remaining storage amount of the plurality of blockchain network nodes is greater than a storage threshold, issuing a subscription request to a target address of a currently executed sub-contract each time a sub-contract is executed.

In this embodiment, the data management method further comprises: counting a number of times data provided by a data provider corresponding to each blockchain network node of the blockchain network is acquired; and in the case where the remaining storage amount of the plurality of blockchain network nodes is not greater than the storage threshold, issuing an unsubscription request to a data provider that provides data a number of times which is acquired is less than a reference threshold, or issuing the unsubscription request to a data provider that provides data a number of times which is acquired is fewest.

In this embodiment, the data management method further comprises: receiving a subscription success response or a subscription failure response from the data provider corresponding to a blockchain network node pointed to by a target address of a currently executed sub-contract. The subscription success response is returned by the data provider corresponding to the blockchain network node pointed to by the target address of the currently executed sub-contract in the case where the requested data is determined to exist based on a subscription request that is received, and the subscription failure response is returned by the data provider corresponding to the blockchain network node pointed to by the target address of the currently executed sub-contract in the case where the requested data is determined not to exist based on the subscription request that is received.

In this embodiment, the data acquisition request comprises a data acquisition priority. The data management method further comprises: executing the data subscription contract to create a subscription priority based on the data acquisition priority; and comprising the subscription priority in a subscription request and issuing the subscription request to the data provider corresponding to a blockchain network node pointed to by a target address of a currently executed sub-contract, so as to enable the data provider corresponding to the blockchain network node pointed to by the target address of the currently executed sub-contract, in the case where the requested data is determined to exist, to determine whether the subscription priority comprised in the subscription request is greater than a priority preset value, and in the case where the subscription priority comprised in the subscription request is determined to be greater than the priority preset value, to return a subscription success response.

According to another aspect of the embodiments of the present disclosure, a plurality of data management devices based on blockchain are provided. Each data management device comprises: a processor; and a memory, having instructions stored thereon. The instructions, when executed, cause respective processors of the plurality of data management devices to jointly execute the data management method described above.

According to another aspect of the embodiments of the present disclosure, a data management system based on blockchain is provided. The data management system comprises: a blockchain network, comprising a plurality of blockchain network nodes, where the plurality of blockchain network nodes are configured to execute the data management method described above; a data provider, configured for providing data to the blockchain network as required; and a data requester, configured for requesting data from the blockchain network.

According to another aspect of the embodiments of the present disclosure, a blockchain network is provided. The blockchain network comprises a plurality of blockchain network nodes, and each blockchain network node is configured to execute the data management method described above.

BRIEF DESCRIPTION OF THE DRAWINGS

In order to explain the principles of the present disclosure, the embodiments of the present disclosure will be described in conjunction with the accompanying drawings. It should be understood that the elements shown in the drawings may be implemented in various forms of hardware, software, or combinations thereof. These elements are optionally implemented in a combination of hardware and software on one or more suitably programmed general-purpose computer devices.

DETAILED DESCRIPTION

Figure 1:
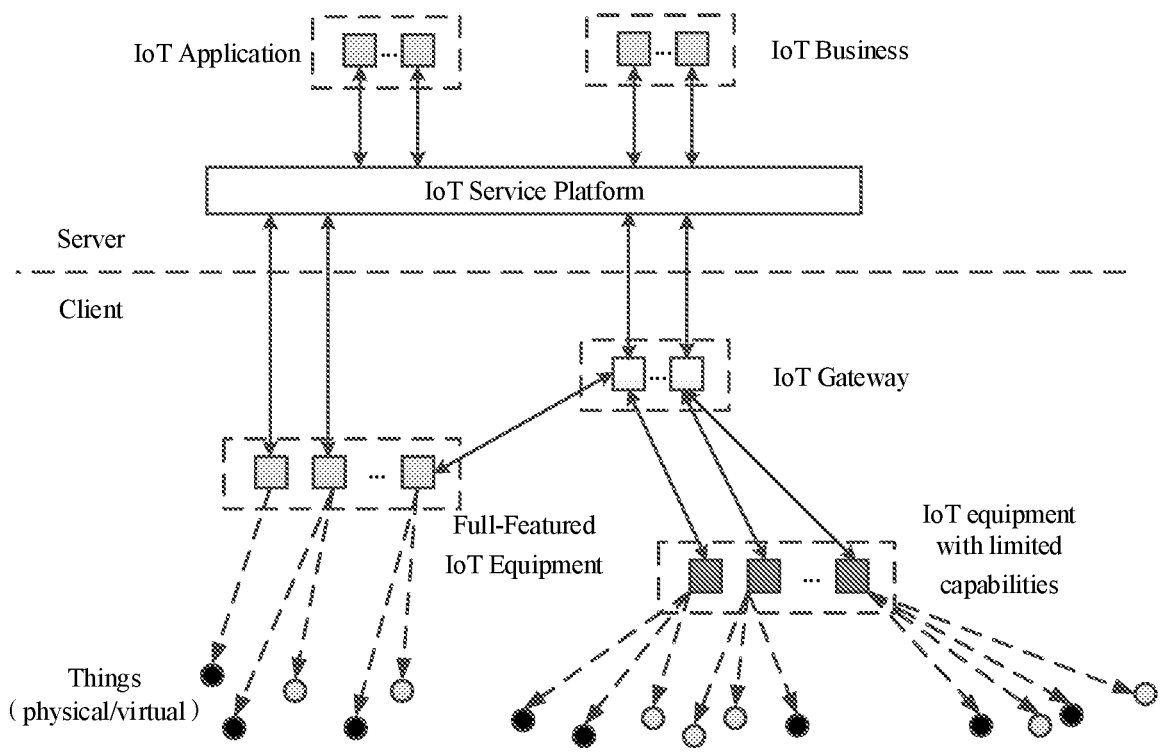
FIG. 1 illustrates an Internet of Things system framework.

The embodiments of the present disclosure will be described more fully hereinafter with reference to the accompanying drawings, in which the embodiments of the disclosure are shown. However, the present disclosure may be implemented in many different forms and should not be explained as being limited to the embodiments set forth herein. Throughout the present disclosure, similar reference numerals are used to refer to similar elements.

The terms used herein are for the purpose of describing particular embodiments only and are not intended to limit the present disclosure. As used herein, the singular forms "a" and "the" are intended to include the plural forms as well, unless the context clearly dictates otherwise. It will also be understood that, when used herein, the terms "include" and "comprise" specify the presence of stated features, integers, steps, operations, elements, and/or components, but do not preclude the presence or addition of one or more other features, integers, steps, operations, elements, components and/or groups thereof.

Unless otherwise defined, the terms (including technical and scientific terms) used herein have the same meaning as commonly understood by one of ordinary skill in the art to which the present disclosure belongs. The terms used herein should be explained to have meanings consistent with their meanings in the context of the present disclosure and the relevant art, and not to be explained in an idealized or overly formal sense, unless expressly so defined herein.

The present disclosure is described below with reference to block diagrams and/or flowcharts illustrating methods, devices (systems), and/or computer program products according to the embodiments of the present disclosure. It will be understood that a block and combinations of blocks of the block diagrams and/or flowcharts can be implemented by computer program instructions. These computer program instructions are provided to processors of a general-purpose computing equipment and a special-purpose computing equipment, and/or other programmable data processing devices, such that the instructions executed via the computing device processor and/or other programmable data processing apparatus create a method of functions/acts specified in the block diagrams and/or flowchart blocks.

Accordingly, the present disclosure may also be implemented in hardware and/or software (including firmware, resident software, microcode, etc.). Still further, the present disclosure may take the form of a computer program product on a computer-usable or computer-readable storage medium having computer-usable or computer-readable program codes embodied in the medium for use by an instruction execution system or use in conjunction with an instruction execution system. In the context of the present disclosure, the computer-usable or computer-readable medium can be any medium that can contain, store, communicate, transmit, or transfer a program for use by an instruction execution system, device, or equipment, or use in conjunction with an instruction execution system, device, or equipment.

Figure 2A:
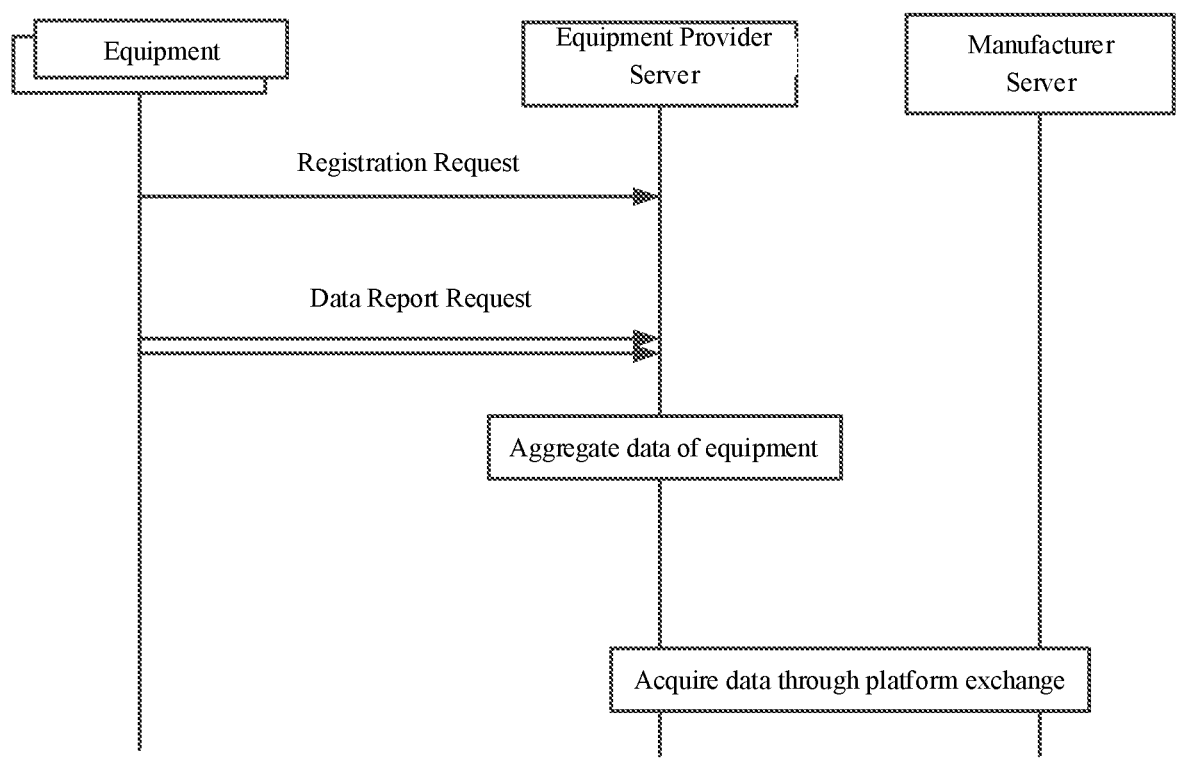
FIG. 2A-FIG. 2B illustrate a data interaction process between various participants in a smart manufacturing application.

As mentioned above, there is a partnership between the parties (e.g., equipment provider and manufacturer) involved in equipment sharing, and the equipment provider charges the manufacturer for using their equipment based on usage of factors such as usage rate, amount of use, time of use, etc., of the devices. In order to accurately calculate the usage of the equipment, the equipment provider is responsible for data collection related to the usage of the equipment and charges the manufacturer after calculating the usage of the equipment. The specific data interaction process is shown in FIG. 2A, the equipment provider server acquires the data uploaded by the equipment and calculates the usage of the equipment, and the manufacturer server requests the equipment provider server for data about the usage of the equipment and performs payment through platform interaction.

Taking smart manufacturing as an example, the non-business data (including usage data) of the equipment is collected and calculated by the equipment provider server, and the manufacturer server pays the fee according to the calculation result of the equipment provider server. If there is a data modification on the equipment provider server, this can result in a difference in cost and is agnostic to the manufacturer server. In addition, other supply chain enterprises of the manufacturer also need to acquire the usage data of the equipment, so that they can stock up in time according to the usage of the equipment. In order to enhance mutual trust between equipment providers and manufacturers, as well as other supply chain enterprises, it is necessary to provide a new mechanism to ensure that the data of the equipment is accurate and unmodifiable, thereby establishing mutual trust between partners.

As an emerging distributed data storage technology, blockchain technology has the following advantages.

The first is the credibility of the data. Different from a traditional distributed database, the blockchain introduces the concept of "everyone keeping accounts". Each participant joins the blockchain through client applications and has the right to keep accounts, and everyone can keep the latest ledgers and all historical records. This highly redundant storage method of data can improve the information transparency between participants who do not trust each other, realize that the ledger data cannot be tampered with and leave traces throughout the process, thereby promoting multi-party information sharing and collaborative operation. The second is the equivalence of participants. The unified distributed ledger technology of the blockchain naturally solves the problem of "business sovereignty", effectively realizes the equivalence of identity, power, responsibilities, and interests of each participant, and realizes real-time synchronization and updating of data among all participants, thereby making cooperation more convenient and efficient, and improving the enthusiasm of partners.

That is, the blockchain can realize the credibility of business data and the equivalence of participants, promote multi-party information sharing and collaborative operation, realize real-time synchronization and updating of data among various participants, and ensure that the data is accurate and unmodifiable, so as to establish mutual trust among the participants. The participants mentioned in the present disclosure are the blockchain network nodes in the blockchain network, such as servers, computers, telephones, etc. connected through the network. For different types of blockchains, the way to become a node will be different.

Figure 2B:
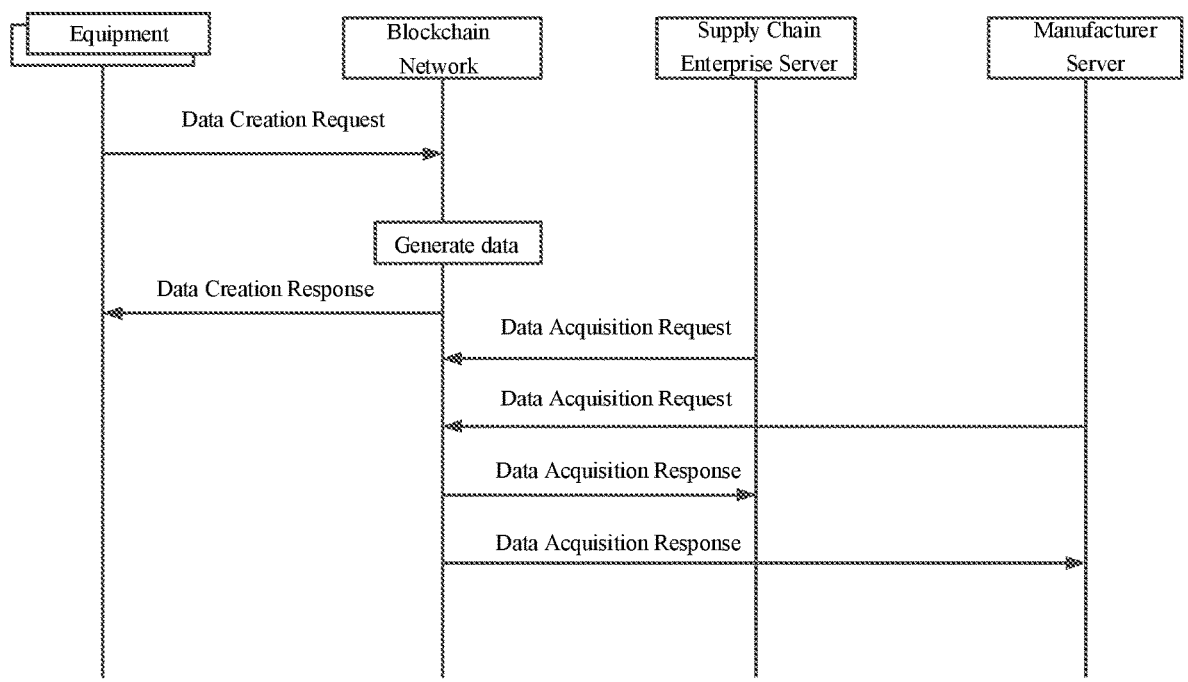

The data trust problem between different participants can be solved through blockchain technology, and the data exchange, in this case, can be shown in FIG. 2B. First, equipment (in the present disclosure, the equipment refers to equipment with sensors and capable of uploading sensor data representing its operating parameter data) issues a data creation request directly to the blockchain network (node) through the communication interface according to preset rules (for example, every predetermined time period) to upload data and related information (for example, equipment identification and time identification, etc.). After receiving the data and related information uploaded by the equipment, the blockchain network generates data (shared between nodes) in the blockchain network and returns a data creation response. When a data requester (for example, a manufacturer and a supply chain enterprise, etc.) needs to acquire data (for example, usage of the equipment), the data requester issues a data acquisition request to the blockchain network, and in the case where the requested data exists in the blockchain network, receives a data acquisition response including the requested data from the blockchain network. Therefore, through this interaction, the data related to the usage of the equipment is stored in the blockchain network, thus increasing the mutual trust between the various participants.

However, in the current data management method based on the blockchain network, because the blockchain network ensures the security of the data through the high redundancy of data, and the data storage amount of the blockchain network nodes is limited, it may not be possible to store all the data uploaded by the equipment or the cost is high.

Based on this, the embodiments of the present disclosure provide a data management method based on blockchain, a data management device, a blockchain network, and a system for subscribing to the required data, so that only subscribed data need to be stored in the blockchain network without storing all the data.

In this case, the data provider is configured for receiving and storing all data uploaded by the equipment and updating them in real time, rather than the equipment directly communicating data with the blockchain network. In the context of the present disclosure, the data provider or data requester is logically independent of respective nodes of the blockchain network, but is physically independent of the blockchain network or integrated with the blockchain network nodes in one device. For example, a server can act as a node in the blockchain network, but can also act as a data provider or data requester.

In addition, it should be noted that in some embodiments of the present disclosure, the application of the data management technology based on the blockchain network to the smart manufacturing industry is described as an example. However, those skilled in the art will understand that data management technology based on the blockchain network provided by the embodiments of the present disclosure can be applied to any other data sharing scenarios that need to increase mutual trust, which is not limited in the present disclosure.

Figure 3:
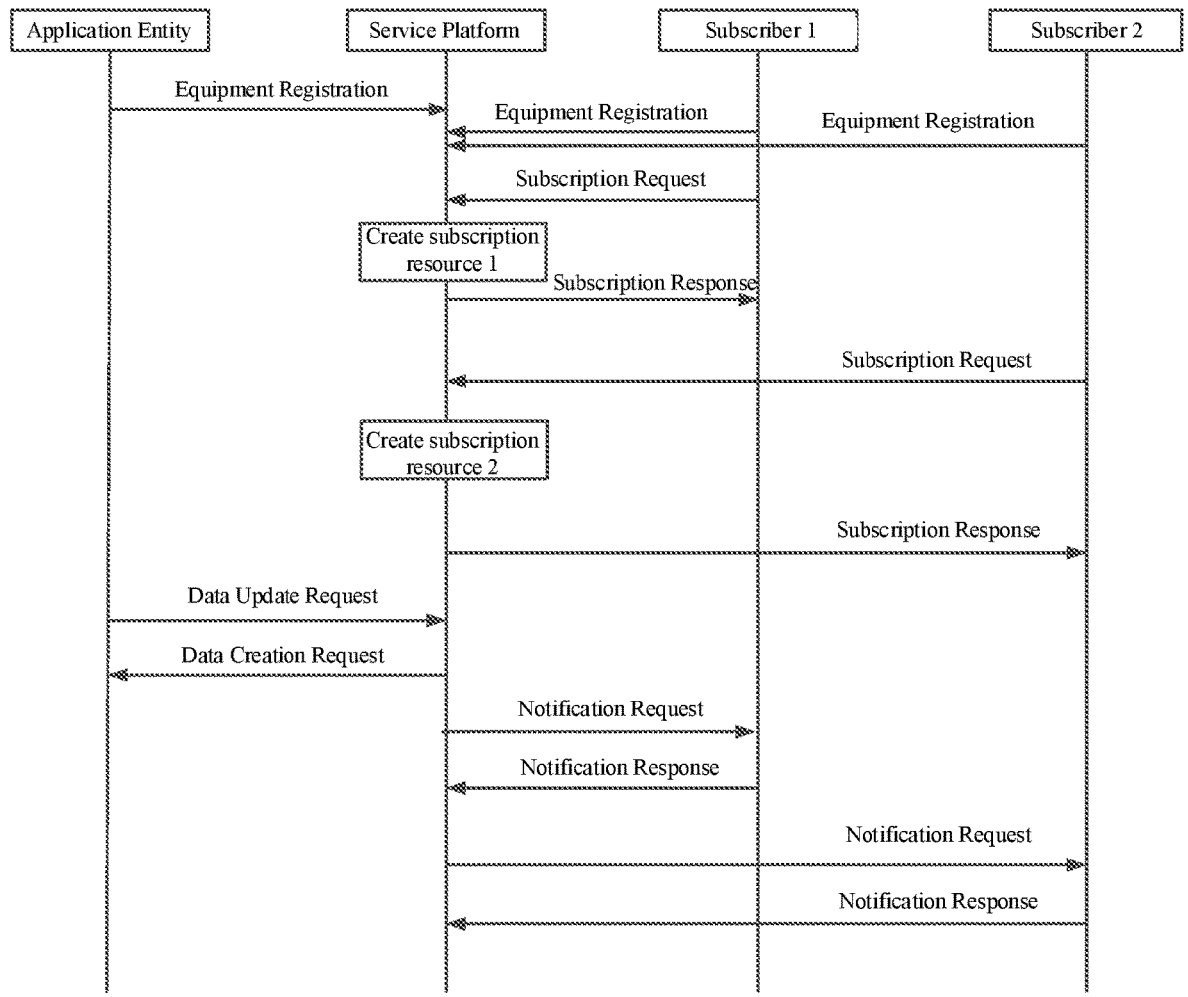
FIG. 3 illustrates a schematic flowchart of a subscription mechanism in the Internet of Things technology.

First, a brief introduction is made based on the subscription mechanism in the Internet of Things technology to facilitate the detailed description of the embodiments of the present disclosure later. FIG. 3 illustrates a schematic flowchart of a subscription mechanism in the Internet of Things technology. In FIG. 3, respective subscribers (such as subscriber 1 and subscriber 2 shown in FIG. 3) subscribe to the data in the platform, and when the data provider (such as an electricity meter that uploads the data) generates the corresponding data subscribed by respective subscribers, the platform issues notifications to subscribers, so that subscribers can acquire updated subscription data in real time.

Figure 4A:
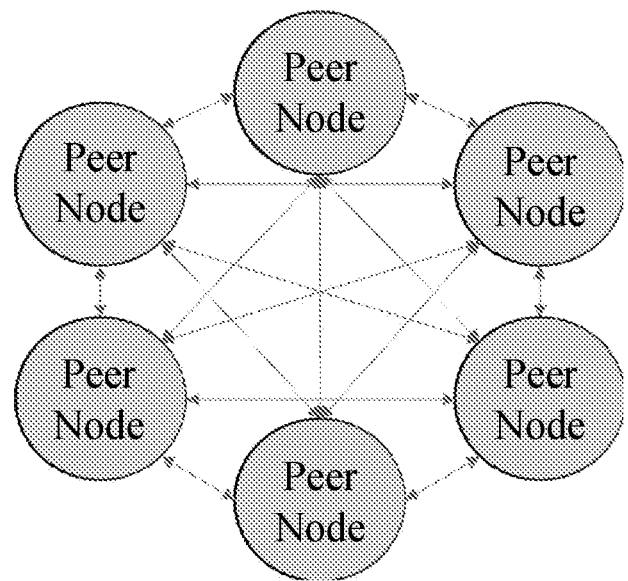
FIG. 4A-FIG. 4B illustrate schematic diagrams of a blockchain network according to at least one embodiment of the present disclosure.
Figure 4B:
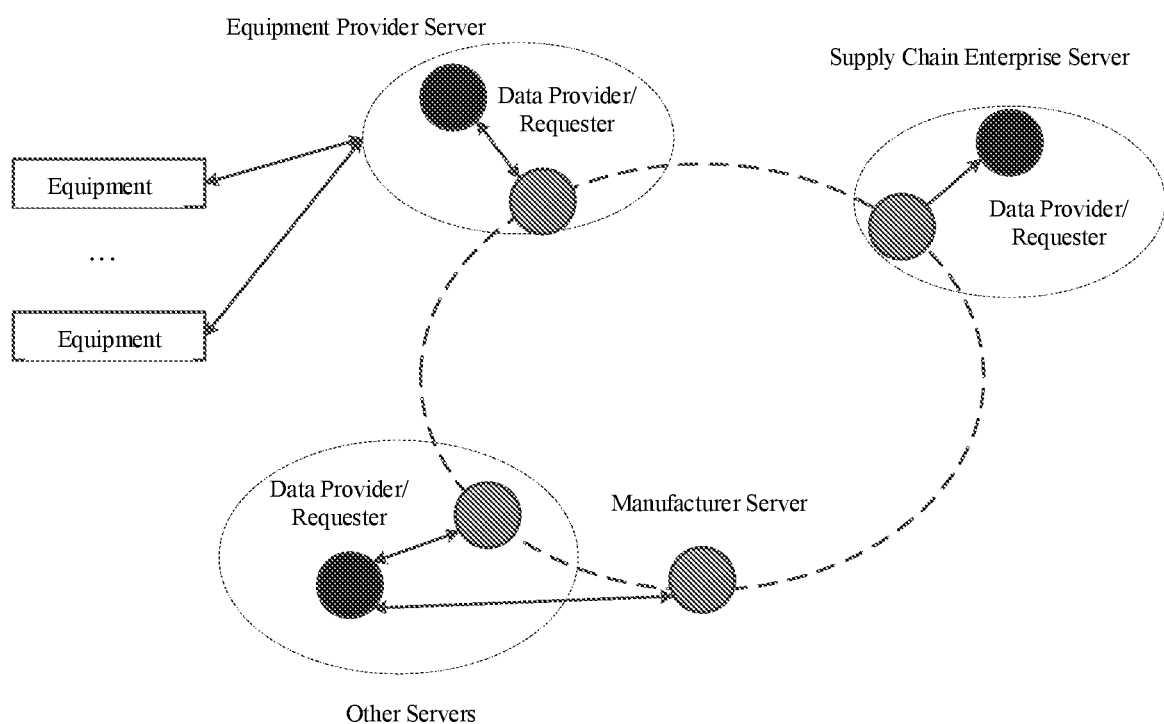

Next, the blockchain network involved in the embodiments of the present disclosure will be introduced. FIG. 4A-FIG. 4B illustrate the blockchain network according to at least one embodiment of the present disclosure.

As shown in FIG. 4A, the blockchain network is a decentralized network, which can also be regarded as a P2P (Peer-to-Peer) network. There is no centralized service and hierarchical structure in the blockchain network, each node based on the consensus mechanism is a peer node, and respective nodes jointly provide network services.

As a more specific application, in the case where the embodiments of the present disclosure are applied in the smart manufacturing industry, a specific blockchain network as shown in FIG. 4B may be configured for data management.

As shown in FIG. 4B, equipment provider servers (as data providers), manufacturer servers, and supply chain enterprise servers (not shown) involved in the smart manufacturing industry join the blockchain network as the blockchain network nodes, each blockchain network node has the same functional attributes for the blockchain, and respective equipment communicate with the data provider to upload data to it. In the present disclosure, the case where the equipment directly uploads data to the data provider is described as an example, but the present disclosure is not limited to this, and the equipment may also upload data to the data provider via intermediate equipment. The intermediate equipment may be an industrial gateway between the blockchain network and the equipment, more generally, may be edge equipment (EDGE), the number of which can be one or more, distributed near respective equipment, with local computing, storage, and networking functions, and can quickly process nearby data without returning the data to the data center and cloud service provider.

As mentioned above, it is necessary to share data among equipment providers, manufacturers, and other supply chain enterprises based on the blockchain network. However, due to the huge amount of equipment operation data and the respective data of equipment providers, manufacturers, and other supply chain enterprises, writing all of them into the blockchain for sharing would require high storage capacity at the blockchain network nodes.

Therefore, only part of the data are stored in the blockchain network (i.e., at the blockchain network nodes), but not all of the data, while the rest of the data are stored at one or more data providers. As mentioned above, a server can act as a node of the blockchain network, but it can also act as a data provider or data requester. Therefore, the data provider can provide data to the blockchain network as needed. In FIG. 4B, the device provider server (shown by the dotted line) can serve as a data provider, and multiple equipment can report equipment operation data to the equipment provider server. The equipment provider server can calculate the usage of the equipment based on the equipment operation data, and the equipment provider can charge the manufacturer based on this. The equipment operational data are data associated with the usage of the equipment.

In addition, it is not only the equipment provider server that acts as a data provider because it can acquire the data of the equipment, and in other cases, the equipment provider may also need to acquire the data of the manufacturer and supply chain enterprises. Therefore, in addition to the equipment provider server, other servers serving as blockchain network nodes can also serve as data providers to provide non-shared data other than the data shared in the blockchain network. Therefore, not only manufacturer servers and supply chain enterprise servers, the provider servers can also act as data requesters to request data from the blockchain network.

A data management system based on the blockchain and working processes 500A-500B according to the embodiments of the present disclosure are described below in conjunction with FIG. 5A-FIG. 5B.

Figure 5A:
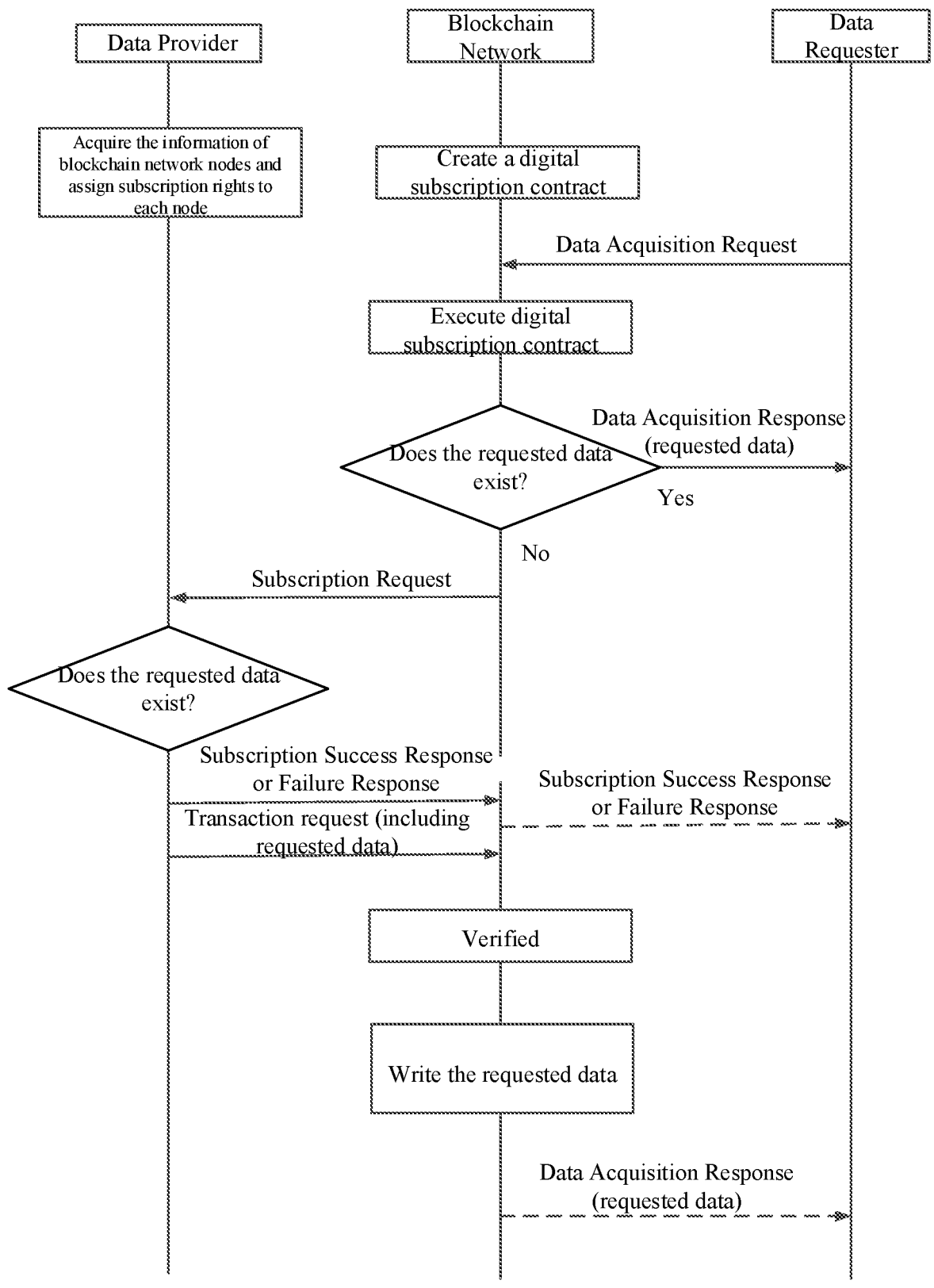
FIG. 5A-FIG. 5B illustrate a data management system based on blockchain and a working process thereof according to at least one embodiment of the present disclosure.
Figure 5B:
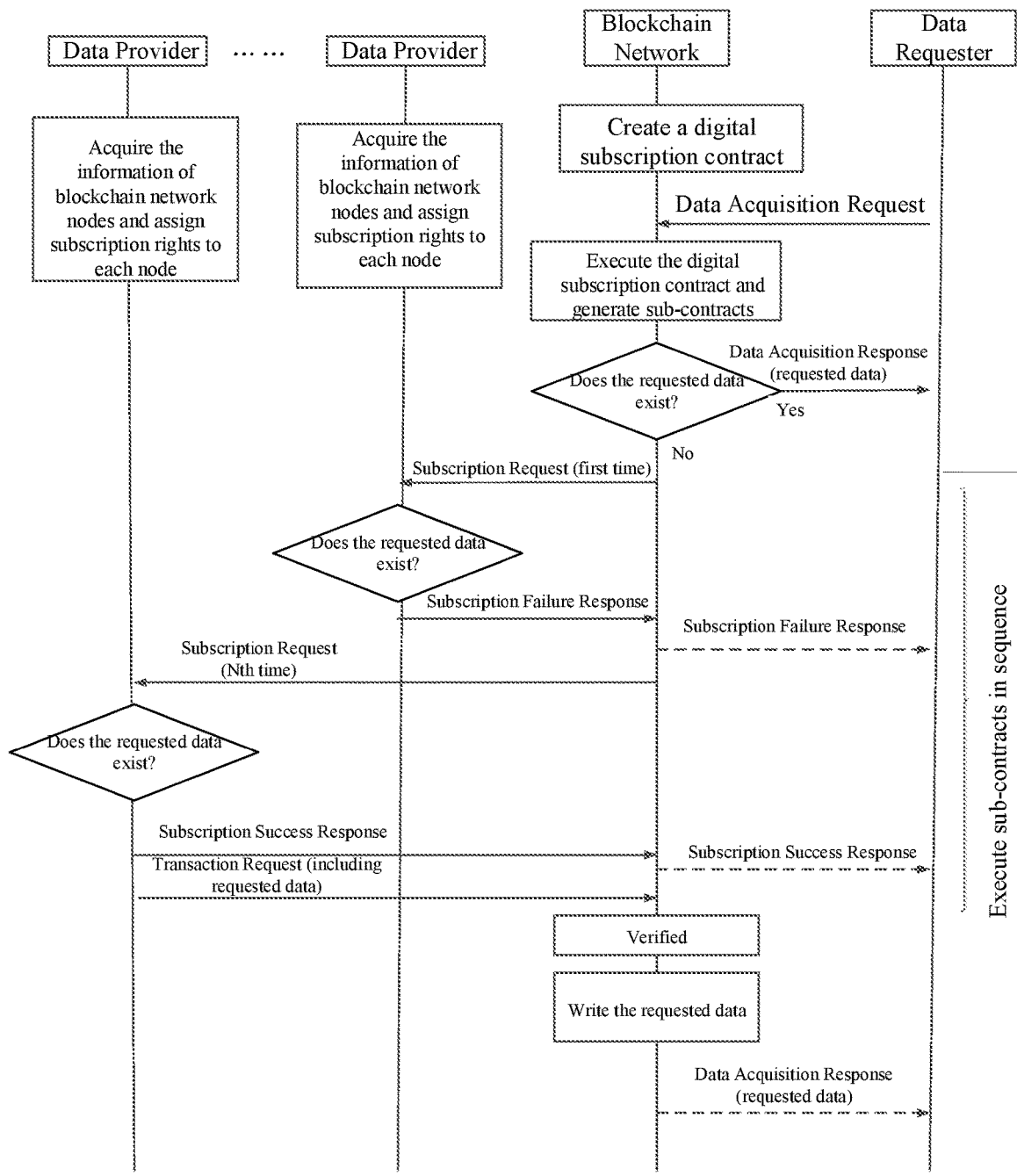

As shown in FIG. 5A-FIG. 5B, the data management system includes a blockchain network, including a plurality of blockchain network nodes (not shown); a data provider, configured for providing data to the blockchain network as required (e.g., based on a subscription request from the blockchain network); and a data requester, configured for requesting data from the blockchain network (e.g., by issuing a data acquisition request to the blockchain network).

Taking smart manufacturing as a specific application scenario, the blockchain network nodes include equipment provider servers, manufacturer servers, and supply chain enterprise servers. However, the present disclosure is not limited thereto, and other participants that need to exchange data can also adopt the data management system according to the embodiment of the present disclosure, and the blockchain network node can also adopt other forms.

As shown in FIG. 5A, first, respective servers join the blockchain network as respective blockchain network nodes (not shown).

Then, the data provider acquires information (e.g., identification information) of respective blockchain network nodes to assign subscription rights to respective blockchain network nodes, so that each blockchain network node can all subscribe to data from the data provider. The total number of data providers is one or more, so each data provider can assign subscription rights to respective blockchain network nodes. Each data provider can exist independently of the blockchain network, or be deemed to exist in a server together with at least one blockchain network node. In order to clearly describe the logical relationship between them, the data provider and the blockchain network (node) are shown separately in the figure, but physically the data provider and the blockchain network node may exist in one device.

In addition, respective blockchain network nodes further need to create a data subscription contract to implement specific operations (such as determining whether the requested data, subscription data, etc. exist as described later) based on the execution of the data subscription contract. In order to make the description of the present disclosure more complete and facilitate the understanding of the present disclosure, the digital subscription contracts involved in the embodiments of the present disclosure and the sub-contracts that follow will be introduced here. In blockchain technology, smart contracts are usually written in a high-level programming language like Solidity, and are deployed on the blockchain network through contract creation transactions. A contract can call another contract. A data subscription contract may be a type of smart contract and its execution is triggered by a transaction request, which may be a data acquisition request. The data subscription contract further includes a program for executing a request data judgment method, and the judgment method is used to judge whether the requested data exists in the blockchain network or the blockchain network node. In addition, the data subscription contract further includes a program for executing a data subscription method, and the data subscription method is configured for subscribing data to the data provider. In addition, the data subscription contract further includes a program for executing a sub-contract generation method, and the sub-contract generation method is used to generate a sub-contract according to the data subscription contract, and the sub-contract is configured for subscribing data to the data provider. The programs that execute the methods in the data subscription contract can call each other. For example, the program for executing the data judgment method can call the program for executing the data subscription method, and the program for executing the data subscription method can call the program for executing the sub-contract generation method. However, these are just examples, and various programs for executing other methods can be included in the data subscription contract and call each other according to actual needs. Next, the data requester issues a data acquisition request to the blockchain network (i.e., the blockchain network node) to request data from the blockchain network. For example, the data requester includes data identification information of the requested data in the data acquisition request (the data identification information is used to identify the requested data, and specific examples include one or more of the ID of the device that generates the data, the name code of the data, the type code, etc. For example, when it is desired to acquire the voltage of equipment A, then the data identification information of the requested data include the identification (ID) of equipment A and the code of the voltage). Likewise, each data requester can exist independently of the blockchain network, or be deemed to exist in a server together with at least one blockchain network node. In order to clearly describe the logical relationship between them, the data requester and the blockchain network (node) are shown separately in the figure.

The respective blockchain network nodes share data in the blockchain network, so the data requester can issue a data acquisition request to a blockchain network node, and then the blockchain network node can broadcast the data acquisition request in the blockchain network. After each blockchain network node receives the data acquisition request, each blockchain network node executes the digital subscription contract to determine whether the requested data exists in the blockchain network based on the data identification information of the requested data included in the data acquisition request, and if the requested data exists in the blockchain network (for example, a copy of the distributed ledger is stored at each blockchain network node, and whether the requested data exists can be determined by querying the copy of the distributed ledger, the requested data is returned to the data requester (for example, the requested data is returned to the data requester through the blockchain network node that receives the data acquisition request). For example, a data acquisition response including the requested data is returned, and if it is determined that the requested data does not exist in the blockchain network, a subscription request is issued to the data provider, so that the requested data can be acquired from the data provider. Each blockchain network node executes the data subscription contract.

The data provider returns a subscription success response in the case where the requested data is determined to exist based on the received subscription request, and returns a subscription failure response in the case where the requested data is determined not to exist based on the received subscription request. The blockchain network can forward the subscription success response or subscription failure response from the data provider to the data requester after receiving it.

Before, after, or at the same time as the data provider returns the subscription success response, the data provider issues a transaction request containing the requested data to the blockchain network (respective blockchain network nodes), and the blockchain network (respective blockchain network nodes) writes the requested data into the blockchain network after verifying the requested data, and can immediately return the requested data to the data requester. For example, the requested data is included in the data acquisition response and issued to the data requester, or the requested data is returned to the data requester after the data requester issues the data acquisition request for the requested data again.

In addition, after the blockchain network (respective blockchain network nodes) successfully subscribes to the data of the data provider, the requested data is acquired through the subscription, and an updated version of the subscribed requested data is acquired from the data provider (for example, the requested data is the voltage of equipment A, after the voltage of 3 pm is acquired, the voltage of 4 pm is further acquired (updated version)). Therefore, in addition to the requested data, the data requester may further wish to acquire the updated version of the requested data from the blockchain network. In this case, the data provider can further be made to include the updated version of the requested data in the transaction request and issue it to the blockchain network whenever there is an updated version of the requested data. The blockchain network verifies the updated version of the requested data and writes it into the blockchain network after the verification passes. For example, when writing the updated version of the requested data, the updated version is stored with the previous version and marked with a time stamp, or the previous version is replaced with the updated version.

More specifically, in some embodiments, the data subscription contract includes the identification information of the data provider. In this case, when respective blockchain network nodes issue the subscription request to the data provider, the subscription request is issued to the data provider corresponding to the identification information. FIG. 5A shows the working process 500A in this case, that is, the data provider is determined, so even though there may be one or more data providers, it is represented by one data provider in FIG. 5A.

In this case, considering to ensure that the blockchain network can have sufficient storage amount to receive the subscribed data (the requested data and/or the updated version of the requested data) from the data provider, it is also necessary to determine the remaining storage amount of all blockchain network nodes (determine the total remaining storage amount of all blockchain network nodes, or determine the remaining storage amount of each blockchain network node), and in the case where the remaining storage amount of the blockchain network nodes is greater than a storage threshold, a subscription request is issued to the data provider. Here, each blockchain network node may determine the remaining storage amount before issuing a subscription request, and issue a subscription request to the data provider if the storage amount requirement is met. The present disclosure does not limit the sequence, for example, the remaining storage amount of the blockchain network nodes can also be determined before executing the data subscription contract.

For example, the storage threshold is a capacity threshold or a capacity percentage threshold. In addition, in the case where the remaining storage amount of all blockchain network nodes is not greater than the storage threshold, the specific content from some data providers can be selectively discarded, that is, the specific content is no longer subscribed from these data providers. For example, the number of times data at all blockchain network nodes is acquired is counted. For example, the data provider that provides data the number of times of which is acquired is less than a reference threshold or is the fewest is a data provider that is considered to be unimportant. Therefore, respective blockchain network nodes issue an unsubscription request to the data provider that provides data the number of times which is acquired is less than the reference threshold, that is, the data provided by the data provider is no longer acquired. Alternatively, the number of times data at all blockchain network nodes is acquired is counted, and an unsubscription request is issued to the data provider that provides data the number of times which is acquired is the fewest, so that the data provider no longer provides the data to the blockchain network. By unsubscribing the data with the fewest number of acquisitions, the blockchain network can dynamically update the data in the blockchain network, preventing the blockchain network from storing a large amount of data, ensuring the performance of the blockchain network and meeting the requirements of the data requester.

Optionally, multi-level storage thresholds may also be set, for example, in the case where the remaining storage amount of all blockchain network nodes is greater than a first storage threshold, a subscription request is issued to the data provider. In the case where the remaining storage amount of all blockchain network nodes is not greater than the first storage threshold and greater than a second storage threshold (the second storage threshold is smaller than the first storage threshold), the specific content from some data providers can be selectively discarded, and in the case where the remaining storage amount of all blockchain network nodes is not greater than the second storage threshold, stop subscribing to all data providers. According to the actual situation, more levels of storage thresholds may also be set to determine whether to subscribe to data providers or not to subscribe which data to which data providers, which is not limited in the present disclosure.

In addition, in order to enhance the reliability and priority of the data subscription process, the data requester can include the data acquisition priority in the data acquisition request issued to the blockchain network node, and respective blockchain network nodes can execute the data subscription contract to create a subscription priority based on the data acquisition priority, and the subscription priority is included in the subscription request to issue a subscription request to the data provider, so that the data provider, in the case of determining that the requested data exists, further determines whether the subscription priority included in the subscription request is greater than a priority preset value, and the data provider, in the case of determining that the subscription priority included in the subscription request is greater than the preset priority value, can return a successful subscription response and issue a transaction request including the requested data to the blockchain network, and optionally a transaction request including an updated version of the requested data is subsequently issued to the blockchain network based on the successful subscription. By setting the data acquisition priority, the blockchain network can dynamically prioritize data acquisition requests with higher priorities according to the data acquisition priority, and subscribe to data with higher priorities to meet the business needs of the data requester and improve the real-time performance of the blockchain network.

Meanwhile, in other embodiments, the data subscription contract does not include the identification information of the data provider. In this case, in the case where the requested data does not exist in the blockchain network, sub-contracts of the data subscription contract are generated when the data subscription contract is executed by each blockchain network node. The target address of each sub-contract points to a data provider corresponding to a blockchain network node, each target address can be accessed by all blockchain network nodes, and the amount of the sub-contracts of the data subscription contract is equal to the amount of the blockchain network nodes. More than two blockchain network nodes may correspond to one data provider, which is not limited in the present disclosure. The working process, in this case, is shown in FIG. 5B. In FIG. 5B, the data provider is not determined, so it is possible that the blockchain network needs to interact with multiple data providers, thus multiple data providers are shown. In FIG. 5B, the process before executing the digital subscription contract is the same as that in FIG. 5A.

In FIG. 5B, when executing the digital subscription contract, it is not only necessary to determine whether the requested data exists in the blockchain network, but also to generate the sub-contracts of the data subscription contract, and in the case of determining that the requested data does not exist in the blockchain network, respective blockchain network nodes execute each sub-contract in turn, and for a currently executed sub-contract, issue a subscription request to the target address of the currently executed sub-contract to subscribe the requested data to the data provider corresponding to the blockchain network node pointed to by the target address.

In this case, considering to ensure that the blockchain network has sufficient storage capacity to receive the subscribed data from the data provider, the blockchain network node can further determine the remaining storage amount (determine the total remaining storage amount of all blockchain network nodes, or determine the remaining storage amount of each blockchain network node), and in the case where the remaining storage amount of the blockchain network nodes is greater than the storage threshold, a subscription request is issued to the target address of the currently executed sub-contract each time the sub-contract is executed. Here, all blockchain network nodes can determine the remaining storage amount before issuing a subscription request each time the sub-contract is executed, and issue a subscription request to the target address of the currently executed sub-contract if the storage amount requirement is met. The present disclosure does not limit the sequence, for example, the remaining storage amount of the blockchain network nodes can also be determined before executing the data subscription contract.

For example, the storage threshold is a capacity threshold or a capacity percentage threshold. In addition, in the case where the blockchain network node, the remaining storage amount of which is not greater than the storage threshold, exists, the specific content from some data providers can be selectively discarded, that is, the specific content is no longer subscribed from these data providers. For example, the number of times data at all blockchain network nodes is acquired is counted. For example, the data provider that provides data the number of times which is acquired is less than a reference threshold or is the fewest is a data provider that is considered to be unimportant. Therefore, respective blockchain network nodes issue an unsubscription request to the data provider that provides data the number of times which is acquired is less than the reference threshold, that is, the data provided by the data provider is no longer acquired. Alternatively, the number of times data at all blockchain network nodes is acquired is counted, and an unsubscription request is issued to the data provider that provides data the number of times which is acquired is the fewest, so that the data provider no longer provides the data to the blockchain network. By unsubscribing the data with the fewest number of acquisitions, the blockchain network can dynamically update the data in the blockchain network, preventing the blockchain network from storing a large amount of data, ensuring the performance of the blockchain network and meeting the requirements of the data requester.

Optionally, multi-level storage thresholds may also be set, for example, in the case where the remaining storage amount of all blockchain network nodes is greater than a first storage threshold, each time the sub-contract is executed, a subscription request is issued to the target address of the currently executed sub-contract. In the case where the remaining storage amount of all blockchain network nodes is not greater than the first storage threshold and greater than a second storage threshold (the second storage threshold is smaller than the first storage threshold), the content from some data providers can be selectively discarded, and in the case where the remaining storage amount of all blockchain network nodes is not greater than the second storage threshold, stop subscribing to all data providers. According to the actual situation, more levels of storage thresholds may be set to determine whether to subscribe to data providers or not to subscribe which data to which data providers, which is not limited in the present disclosure.

The data provider corresponding to the node pointed to by the target address of the currently executed sub-contract returns a subscription success response in the case where it is determined that the requested data exists based on the received subscription request, and the data provider corresponding to the node pointed to by the target address of the currently executed sub-contract returns a subscription failure response in the case where it is determined that the requested data does not exist based on the received subscription request. The blockchain network can forward the subscription success response or subscription failure response from the data provider to the data requester after receiving it. As shown in FIG. 5B, after executing a first sub-contract, that is, after all blockchain network nodes issue a subscription request to the data provider corresponding to the node pointed to by the target address of the first sub-contract again, because the blockchain network receives a subscription failure response from the data provider, the second sub-contract is executed next, and all blockchain network nodes issue a subscription request to the data provider corresponding to the node pointed to by the target address of the second sub-contract again. Repeating this process in turn until after all blockchain network nodes issue a subscription request to the data provider corresponding to the node pointed to by the target address of an N-th (N is an integer greater than 2) sub-contract again, and then a subscription success response is received from the data provider at this time.

In the case where the data provider corresponding to the node pointed to by the target address of the currently executed sub-contract has returned a successful subscription response, respective blockchain network nodes can stop executing the subsequent sub-contract. Because the requested data can be included in the transaction request returned to the blockchain network by the data provider corresponding to the node pointed to by the target address of the currently executed sub-contract, other data providers are no longer required to provide the requested data.

In addition, in order to enhance the reliability and priority of the data subscription process, the data acquisition priority can be included in the data acquisition request issued to the blockchain network node by the data requester, and respective blockchain network nodes can execute the data subscription contract to create a subscription priority based on the data acquisition priority; and the subscription priority is included in the subscription request to issue a subscription request to the data provider corresponding to the node pointed to by the target address of the currently executed sub-contract, so that the data provider corresponding to the node pointed to by the target address of the currently executed sub-contract, in the case of determining that the requested data exists, determines whether the subscription priority included in the subscription request is greater than a priority preset value, and the data provider, in the case of determining that the subscription priority included in the subscription request is greater than the preset priority value, returns a successful subscription response and issues a transaction request including the requested data to the blockchain network, and optionally a transaction request including an updated version of the requested data is subsequently issued to the blockchain network based on the successful subscription. By setting the data acquisition priority, the blockchain network can dynamically prioritize data acquisition requests with higher priorities according to the data acquisition priority, and subscribe to data with higher priorities to meet the business needs of the data requester and improve the real-time performance of the blockchain network.

Based on the data management system based on the blockchain according to the embodiments of the present disclosure described above with reference to FIG. 4B, and FIG. 5A-FIG. 5B, data that is not stored in the blockchain network can be subscribed from the data provider, so that the data that needs to be stored in the blockchain network can be customized on demand, so the blockchain can only store part of the data. Therefore, while realizing the security based on the blockchain, the requirements for the storage capacity of the blockchain network can be reduced, thereby improving the reliability of the system.

Figure 6:
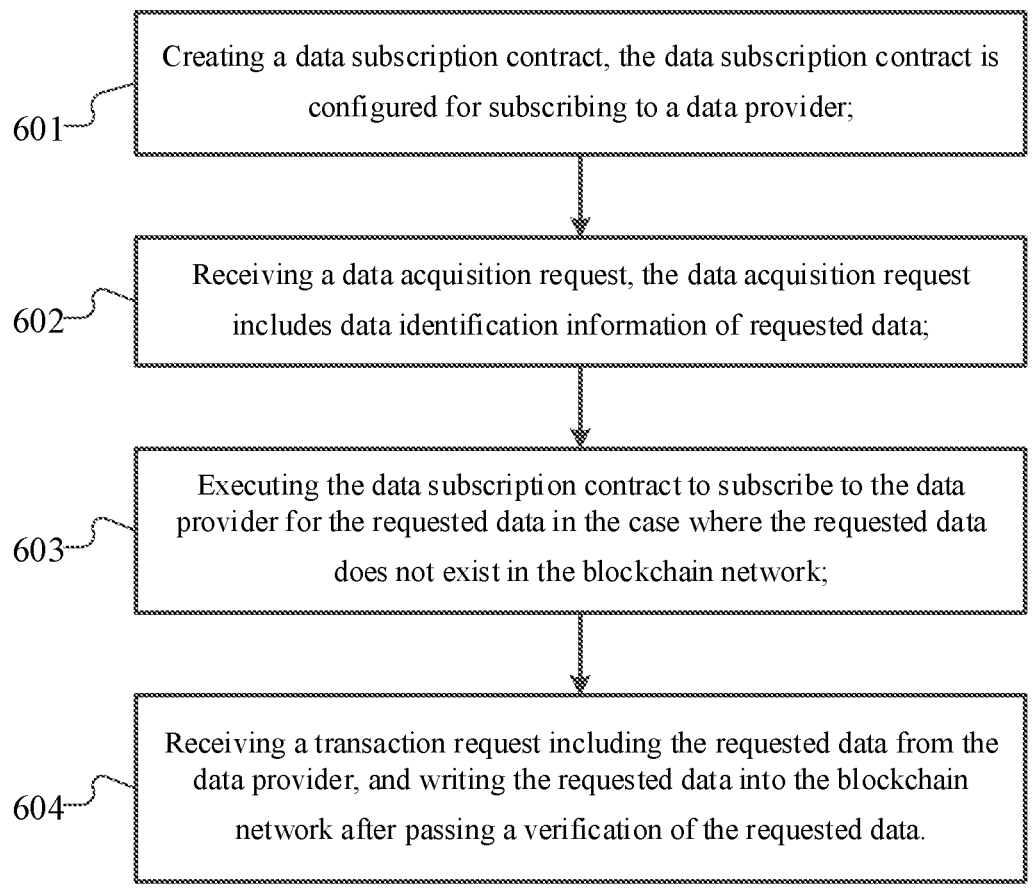
FIG. 6 illustrates a schematic flowchart of a data management method based on the blockchain according to at least one embodiment of the present disclosure.

FIG. 6 illustrates a schematic flowchart of a data management method 600 based on the blockchain according to at least one embodiment of the present disclosure. The method is applied to a plurality of blockchain network nodes in a blockchain network.

In step 601, a data subscription contract is created, and the data subscription contract is used for subscribing to a data provider.

Optionally, the data subscription contract is created at each blockchain network node for execution when a subscription to the data provider is required.

In step 602, a data acquisition request is received, and the data acquisition request includes data identification information of the requested data.

The data identification information is used to identify the requested data, and specific examples include one or more of the ID of the device that generates the data, the name code of the data, the type code, etc. For example, when it is desired to acquire the voltage of equipment A, then the data identification information of the requested data include the identification (ID) of equipment A and the code of the voltage.

In step 603, the data subscription contract is executed to subscribe to the data provider for the requested data in the case where the requested data does not exist in the blockchain network.

That is, the digital subscription contract is executed to determine whether the requested data exists in the blockchain network, and in the case where the requested data exists in the blockchain network, the requested data is returned, that is, the requested data is directly returned to the data requester that issued the data acquisition request, and the requested data is subscribed to the data provider in the case where the requested data does not exist in the blockchain network.

In step 604, a transaction request including the requested data is received from the data provider, and the requested data is written into the blockchain network after passing the verification of the requested data, and optionally, the requested data is immediately returned to the data requester. For example, the requested data is included in a data acquisition response and issued to the data requester, or the requested data is returned to the data requester after the data requester issues the data acquisition request for the requested data again.

For example, the data requester generally issues a data acquisition request to a blockchain network node (the blockchain network node broadcasts the data acquisition request in the blockchain network after receiving the data acquisition request) through an interface, so the requested data can be returned to the data requester through the blockchain network node.

In some embodiments, the data subscription contract includes the identification information of the data provider, so that the blockchain network node, in the case where the data requested by the data requester does not exist in the blockchain network, can issue a subscription request to a certain address (the address of the data provider).

In these embodiments, the plurality of blockchain network nodes receive a subscription success response or a subscription failure response from the data provider, where the subscription success response is returned by the data provider in the case where the requested data is determined to exist based on the received subscription request, similarly, the subscription failure response is returned by the data provider in the case where the requested data is determined not to exist based on the received subscription request.

In these embodiments, considering to ensure that the blockchain network has sufficient storage capacity to receive the subscribed data from the data provider, the data management method 600 may further include: determining the remaining storage amount of all blockchain network nodes; in this case, considering to ensure that the blockchain network has sufficient storage capacity to receive the subscribed data from the data provider, the blockchain network node further determines the remaining storage amount (determines the total remaining storage amount of all blockchain network nodes, or determines the remaining storage amount of each blockchain network node). And on the one hand, in the case where the remaining storage amount of all blockchain network nodes is greater than the storage threshold, a subscription request is issued to the data provider. On the other hand, in the case where the remaining storage amount of all blockchain network nodes is not greater than the storage threshold, the content from some data providers can be selectively discarded, that is, the content is no longer subscribed from these data providers. For example, the number of times data at respective blockchain network nodes is acquired is counted, and an unsubscription request is issued to the data provider that provides data the number of times which is acquired is less than the reference threshold, that is, the data provided by the data provider is no longer acquired. Alternatively, the number of times data at each blockchain network node is acquired is counted, and an unsubscription request is issued to the data provider that provides data the number of times which is acquired is the fewest.

In these embodiments, multi-level storage thresholds may also be set. For example, in the case where the remaining storage amount of respective blockchain network nodes is greater than a first storage threshold, a subscription request is issued to the data provider. In the case where the blockchain network node, the remaining storage amount of which is not greater than the first storage threshold and greater than a second storage threshold (the second storage threshold is smaller than the first storage threshold), exists, the content from some data providers can be selectively discarded, and in the case where the blockchain network node, the remaining storage amount of which is not greater than the second storage threshold, stop subscribing to all data providers. More levels of storage thresholds may also be set to determine whether to subscribe to data providers or not to subscribe which data to which data providers, which is not limited in the present disclosure.

In addition, in order to enhance the reliability and priority of the data subscription process, the data requester can include the data acquisition priority in the data acquisition request issued to the blockchain network node, and respective blockchain network nodes can execute the data subscription contract to create a subscription priority based on the data acquisition priority; and the subscription priority is included in the subscription request to issue a subscription request to the data provider, so that the data provider, in the case of determining that the requested data exists, determines whether the subscription priority included in the subscription request is greater than a priority preset value, and the data provider, in the case of determining that the subscription priority included in the subscription request is greater than the preset priority value, can return a successful subscription response. By setting the data acquisition priority, the blockchain network can dynamically prioritize data acquisition requests with higher priorities according to the data acquisition priority, and subscribe to data with higher priorities to meet the business needs of the data requester and improve the real-time performance of the blockchain network.

In other embodiments, the data subscription contract does not include the identification information of the data provider, so the blockchain network node can only sequentially determine which of the multiple possible data providers can provide the requested data until it is determined that there is a data provider that provides the requested data. In this case, the created data subscription contract is created so that when the data subscription contract is executed, sub-contracts can be generated, and the target address of each sub-contract points to a data provider corresponding to a blockchain network node, and the amount of the sub-contracts of the data subscription contract is equal to the amount of the blockchain network nodes. Therefore, "executing the data subscription contract, in the case where the requested data does not exist in the blockchain network, to subscribe the data provider for the requested data" in step 603 includes: in the case where the requested data does not exist in the blockchain network, executing each sub-contract of the data subscription contract in turn, and for a currently executed sub-contract, issuing a subscription request to a target address of the currently executed sub-contract.

Similarly, in these embodiments, considering to ensure that the blockchain network has sufficient storage capacity to receive the subscribed data from the data provider, respective blockchain network nodes can further determine the remaining storage amount, and in the case where the remaining storage amount of each blockchain network node is greater than the storage threshold, a subscription request is issued to the target address of the currently executed sub-contract each time the sub-contract is executed. For example, the storage threshold is a capacity threshold or a capacity percentage threshold. In addition, in the case where the blockchain network node, the remaining storage amount of which is not greater than the storage threshold, exists, the content from some data providers can be selectively discarded, that is, no more data will be subscribed from these data providers. For example, the number of times data at all blockchain network nodes is acquired is counted. For example, the data provider that provides data the number of times which is acquired is less than a reference threshold or is the fewest is a data provider that is considered to be unimportant. Therefore, respective blockchain network nodes issue an unsubscription request to the data provider that provides data the number of times which is acquired is less than the reference threshold, that is, the data provided by the data provider is no longer acquired. Alternatively, the number of times data at all blockchain network nodes is acquired is counted, and an unsubscription request is issued to the data provider that provides data the number of times which is acquired is the fewest, so that the data provider no longer provides the data to the blockchain network. By unsubscribing the data with the fewest number of acquisitions, the blockchain network can dynamically update the data in the blockchain network, preventing the blockchain network from storing a large amount of data, ensuring the performance of the blockchain network and meeting the requirements of the data requester.

In addition, multi-level storage thresholds may also be set, for example, in the case where the remaining storage amount of respective blockchain network nodes is greater than a first storage threshold, each time the sub-contract is executed, a subscription request is issued to the target address of the currently executed sub-contract. In the case where the blockchain network node, the remaining storage amount of which is not greater than the first storage threshold and greater than a second storage threshold (the second storage threshold is smaller than the first storage threshold), exists, the content from some data providers can be selectively discarded, and in the case where the blockchain network node, the remaining storage amount of which is not greater than the second storage threshold, stop subscribing to all data providers. According to the actual situation, more levels of storage thresholds may be set to determine whether to subscribe to data providers or not to subscribe which data to which data providers, which is not limited in the present disclosure.

The data provider corresponding to the node pointed to by the target address of the currently executed sub-contract returns a subscription success response in the case where it is determined that the requested data exists based on the received subscription request, and the data provider corresponding to the node pointed to by the target address of the currently executed sub-contract returns a subscription failure response in the case where it is determined that the requested data does not exist based on the received subscription request. The blockchain network can forward the subscription success response or subscription failure response from the data provider to the data requester after receiving it.

In the case where the data provider corresponding to the node pointed to by the target address of the currently executed sub-contract has returned a successful subscription response, the execution of subsequent sub-contracts is stopped. Because the requested data can be included in the transaction request returned to the blockchain network by the data provider corresponding to the node pointed to by the target address of the currently executed sub-contract, other data providers are no longer required to provide the requested data.

In addition, in order to enhance the reliability and priority of the data subscription process, the data acquisition priority can be included in the data acquisition request issued to the blockchain network node by the data requester, and respective blockchain network nodes can execute the data subscription contract to create a subscription priority based on the data acquisition priority; and the subscription priority is included in the subscription request to issue a subscription request to the data provider corresponding to the node pointed to by the target address of the currently executed sub-contract, so that the data provider corresponding to the node pointed to by the target address of the currently executed sub-contract, in the case of determining that the requested data exists, determines whether the subscription priority included in the subscription request is greater than a priority preset value, and the data provider, in the case of determining that the subscription priority included in the subscription request is greater than the preset priority value, returns a successful subscription response. By setting the data acquisition priority, the blockchain network can dynamically prioritize data acquisition requests with higher priorities according to the data acquisition priority, and subscribe to data with higher priorities to meet the business needs of the data requester and improve the real-time performance of the blockchain network.

In addition, after the blockchain network (respective blockchain network nodes) successfully subscribes to the data of the data provider, the requested data is acquired through the subscription, and an updated version of the subscribed requested data is acquired from the data provider (for example, the requested data is the voltage of equipment A, after the voltage of 3 pm is acquired, the voltage of 4 pm is further acquired (updated version)). Therefore, in addition to the requested data, the data requester may further wish to acquire the updated version of the requested data from the blockchain network. In this case, the data provider can further be made to include the updated version of the requested data in the transaction request and issue it to the blockchain network whenever there is an updated version of the requested data. The blockchain network verifies the updated version of the requested data and writes it into the blockchain network after the verification passes. For example, when writing the updated version of the requested data, the updated version is stored with the previous version and marked with a time stamp, or the previous version is replaced with the updated version.

Therefore, based on the data management method based on the blockchain according to the embodiments of the present disclosure described above with reference to FIG. 6, data that is not stored in the blockchain network can be subscribed from the data provider, so that the data that needs to be stored in the blockchain network can be customized on demand, so the blockchain can only store part of the data. Therefore, while realizing the security based on the blockchain, the requirements for the storage capacity of the blockchain network can be reduced, thereby improving the reliability of the system.

According to yet another aspect of the present disclosure, a plurality of data management devices based on blockchain are further provided.

Figure 7:
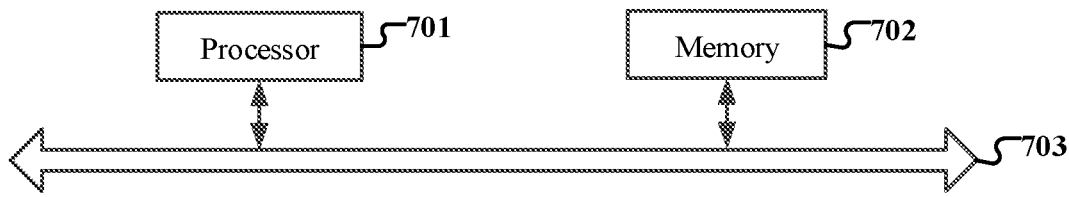
FIG. 7 illustrates a structural block diagram of a data management device according to at least one embodiment of the present disclosure.

FIG. 7 illustrates a plurality of data management devices 700 based on the blockchain according to at least one embodiment of the present disclosure. Each data management device 700 includes a processor 701 and a memory 702. The processor 701 and the memory 702 are connected with each other by a bus 703.

The processor 701 can perform various actions and processes according to instructions stored in the memory 702. When the instructions in the memory are executed, the processor can be caused to perform the steps of the data management method based on the blockchain according to the embodiments of the present disclosure.

Specifically, the processor 701 may be an integrated circuit chip, which has signal processing capability. The above-mentioned processor may be a general-purpose processor, a digital signal processor (DSP), an application specific integrated circuit (ASIC), a field programmable gate array (FPGA), another programmable logic device, a discrete gate or transistor logic device, or a discrete hardware component. The general-purpose processor may be a microprocessor or the processor may also be any conventional processor, etc., and may be of an X86 architecture or an ARM architecture.

The memory 702 may be a volatile memory or a non-volatile memory, or may include both the volatile memory and the non-volatile memory. The non-volatile memory may be a read-only memory (ROM), a programmable read only memory (PROM), an erasable programmable read-only memory (EPROM), an electrically erasable programmable read-only memory (EEPROM), or a flash memory. The volatile memory may be a random access memory (RAM), which acts as an external cache. By way of exemplary but not restrictive description, many forms of RAM are available, such as a static random access memory (SRAM), a dynamic random access memory (DRAM), a synchronous dynamic random access memory (SDRAM), a double data rate synchronous dynamic random access memory (DDRS-DRAM), an enhanced synchronous dynamic random access memory (ESDRAM), a synchronous link dynamic random access memory (SLDRAM), or a direct memory bus random access memory (DRRAM). It should be noted that the memories of the methods described in the present disclosure are intended to include, but are not limited to, these memories and any other suitable types of memories.

In the above-mentioned data management device based on blockchain, data that is not stored in the blockchain network can be subscribed from the data provider, so that the data that needs to be stored in the blockchain network can be customized on demand, so the blockchain can only store part of the data. Therefore, while realizing the security based on the blockchain, the requirements for the storage capacity of the blockchain network can be reduced, thereby improving the reliability of the system.

According to yet another aspect of the embodiments of the present disclosure, a blockchain network is further provided, the blockchain network includes a plurality of blockchain network nodes, and each blockchain network node is configured to perform the data management method as described above. Each blockchain network node may be embodied in the form of a server, and the server may also include a processor and a memory. The processor and the memory may be of the same type as the processor 801 and the memory 802 described with reference to FIG. 8, and the description will not be repeated here.

While the present disclosure has been described in detail with respect to various specific examples and embodiments of the present disclosure, each example is provided by way of explanation rather than a limitation of the present disclosure. Modifications, variations, and equivalents of such embodiments can be easily made by those skilled in the art after gaining an understanding of the foregoing. Therefore, the present disclosure does not exclude the inclusion of such modifications, variations, and/or additions to the present disclosure that would be apparent to those of ordinary skill in the art. For example, features illustrated or described as part of one embodiment can be used with another embodiment to yield yet another embodiment. Therefore, it is intended that the present disclosure cover such modifications, variations, and equivalents.

In particular, although the figures of the present disclosure describe steps performed in a particular order for purposes of illustration and discussion, respectively, the methods of the present disclosure are not limited to the particular illustrated order or arrangement. Various steps of the above-mentioned methods can be omitted, rearranged, combined, and/or adjusted in various ways without departing from the scope of the present disclosure.

Those skilled in the art can understand that various aspects of the present disclosure can be illustrated and described through several patentable categories or situations, including any new and useful combination of process, machine, product, or substance, or any new and useful improvement of them. Accordingly, various aspects of the present disclosure may be performed entirely by hardware, entirely by software (including firmware, resident software, microcode, etc.), or by a combination of hardware and software. The above-mentioned hardware or software may be referred to as a "data block", "module", "engine", "unit", "component" or "system". Furthermore, the various aspects of the present disclosure may be implemented as a computer product including computer-readable program code embodied in one or more computer-readable media.

Unless otherwise defined, all terms (including technical and scientific terms) used herein have the same meaning as commonly understood by one of ordinary skill in the art to which this disclosure belongs. It should also be understood that terms such as those defined in ordinary dictionaries should be interpreted as having meanings consistent with their meanings in the context of the related art, and should not be interpreted in an idealized or highly formalized sense unless explicitly defined herein.

The above is a description of the present disclosure and should not be considered a limitation thereof. Although several exemplary embodiments of the present disclosure have been described, those skilled in the art will easily understand that many modifications can be made to the exemplary embodiments without departing from the novel teachings and advantages of the present disclosure. Therefore, all such modifications are intended to be included within the scope of the present disclosure as defined by the claims. It should be understood that the above is a description of the present disclosure and should not be considered to be limited to the disclosed specific embodiments, and the intention to modify the disclosed embodiments and other embodiments is included in the scope of the appended claims. The present disclosure is defined by the claims and their equivalents.

What is claimed is:

1. A data management method based on blockchain, applied to a plurality of blockchain network nodes of a blockchain network, wherein the method comprises:
    creating a data subscription contract, wherein the data subscription contract is configured for subscribing to a data provider;
    receiving a data acquisition request, wherein the data acquisition request comprises data identification information of requested data;
    executing the data subscription contract to subscribe to the data provider for the requested data in a case where the requested data does not exist in the blockchain network; and
    receiving a transaction request comprising the requested data from the data provider, and writing the requested data into the blockchain network after passing a verification of the requested data.

2. The data management method according to claim 1, wherein the data subscription contract comprises identification information of the data provider.

3. The data management method according to claim 2, further comprising:
    determining a remaining storage amount of the plurality of blockchain network nodes; and
    in a case where the remaining storage amount of the plurality of blockchain network nodes is greater than a storage threshold, issuing a subscription request to the data provider.

4. The data management method according to claim 3, further comprising:
    counting a number of times data at the plurality of blockchain network nodes is acquired; and
    in a case where the remaining storage amount of the plurality of blockchain network nodes is not greater than the storage threshold, issuing an unsubscription request to a data provider that provides data a number of times which is acquired is less than a reference threshold, or issuing the unsubscription request to a data provider that provides data a number of times which is acquired is fewest.

5. A data management system based on blockchain, comprising:
    a blockchain network, comprising a plurality of blockchain network nodes, wherein the plurality of blockchain network nodes are configured to execute the data management method according to claim 3;
    a data provider, configured for providing data to the blockchain network as required; and
    a data requester, configured for requesting data from the blockchain network.

6. The data management method according to claim 2, further comprising:
    receiving a subscription success response or a subscription failure response from the data provider,
    wherein the subscription success response is returned by the data provider in a case where the requested data is determined to exist based on a subscription request that is received, and the subscription failure response is returned by the data provider in a case where the requested data is determined not to exist based on the subscription request that is received.

7. The data management method according to claim 2, wherein the data acquisition request comprises a data acquisition priority, and
    the method further comprises:
    executing the data subscription contract to create a subscription priority based on the data acquisition priority; and
    comprising the subscription priority in a subscription request and issuing the subscription request to the data provider, so as to enable the data provider, in a case where the requested data is determined to exist, to determine whether the subscription priority comprised in the subscription request is greater than a priority preset value, and in a case where the subscription priority comprised in the subscription request is determined to be greater than the priority preset value, to return a subscription success response.

8. A plurality of data management devices based on blockchain, each data management device comprising:
    a processor; and
    a memory, having instructions stored thereon, wherein the instructions, when executed, cause respective processors of the plurality of data management devices to jointly execute the data management method according to claim 2.

9. A data management system based on blockchain, comprising:
    a blockchain network, comprising a plurality of blockchain network nodes, wherein the plurality of blockchain network nodes are configured to execute the data management method according to claim 2;
    a data provider, configured for providing data to the blockchain network as required; and
    a data requester, configured for requesting data from the blockchain network.

10. A blockchain network, comprising a plurality of blockchain network nodes, wherein the plurality of blockchain network nodes are configured to execute the data management method according to claim 2.

11. The data management method according to claim 1, wherein the data subscription contract does not comprise identification information of the data provider.

12. The data management method according to claim 11, wherein the data subscription contract is created, so that sub-contracts of the data subscription contract are generated when the data subscription contract is executed, a target address of each sub-contract points to a data provider corresponding to one blockchain network node, and an amount of the sub-contracts of the data subscription contract is equal to an amount of the blockchain network nodes.

13. The data management method according to claim 12, wherein executing the data subscription contract to subscribe to the data provider for the requested data in the case where the requested data does not exist in the blockchain network comprises:
   in the case where the requested data does not exist in the blockchain network, executing each sub-contract of the data subscription contract in turn; and
   for a currently executed sub-contract, issuing a subscription request to a target address of the currently executed sub-contract.

14. The data management method according to claim 12, further comprising:
   determining a remaining storage amount of the plurality of blockchain network nodes; and
   in a case where the remaining storage amount of the plurality of blockchain network nodes is greater than a storage threshold, issuing a subscription request to a target address of a currently executed sub-contract each time a sub-contract is executed.

15. The data management method according to claim 14, further comprising:
   counting a number of times data provided by a data provider corresponding to each blockchain network node of the blockchain network is acquired; and
   in a case where the remaining storage amount of the plurality of blockchain network nodes is not greater than the storage threshold, issuing an unsubscription request to a data provider that provides data a number of times which is acquired is less than a reference threshold, or issuing the unsubscription request to a data provider that provides data a number of times which is acquired is fewest.

16. The data management method according to claim 12, further comprising:
   receiving a subscription success response or a subscription failure response from the data provider corresponding to a blockchain network node pointed to by a target address of a currently executed sub-contract,
   wherein the subscription success response is returned by the data provider corresponding to the blockchain network node pointed to by the target address of the currently executed sub-contract in a case where the requested data is determined to exist based on a subscription request that is received, and the subscription failure response is returned by the data provider corresponding to the blockchain network node pointed to by the target address of the currently executed sub-contract in a case where the requested data is determined not to exist based on the subscription request that is received.

17. The data management method according to claim 12, wherein the data acquisition request comprises a data acquisition priority, and
   the method further comprises:
   executing the data subscription contract to create a subscription priority based on the data acquisition priority; and
   comprising the subscription priority in a subscription request and issuing the subscription request to the data provider corresponding to a blockchain network node pointed to by a target address of a currently executed sub-contract, so as to enable the data provider corresponding to the blockchain network node pointed to by the target address of the currently executed sub-contract, in a case where the requested data is determined to exist, to determine whether the subscription priority comprised in the subscription request is greater than a priority preset value, and in a case where the subscription priority comprised in the subscription request is determined to be greater than the priority preset value, to return a subscription success response.

18. A plurality of data management devices based on blockchain, each data management device comprising:
   a processor; and
   a memory, having instructions stored thereon, wherein the instructions, when executed, cause respective processors of the plurality of data management devices to jointly execute the data management method according to claim 1.

19. A data management system based on blockchain, comprising:
   a blockchain network, comprising a plurality of blockchain network nodes, wherein the plurality of blockchain network nodes are configured to execute the data management method according to claim 1;
   a data provider, configured for providing data to the blockchain network as required; and
   a data requester, configured for requesting data from the blockchain network.

20. A blockchain network, comprising a plurality of blockchain network nodes, wherein the plurality of blockchain network nodes are configured to execute the data management method according to claim 1.

* * * * *

UNITED STATES PATENT AND TRADEMARK OFFICE
CERTIFICATE OF CORRECTION

| | |
|---|---|
| PATENT NO. | : 11,876,861 B2 |
| APPLICATION NO. | : 18/022797 |
| DATED | : January 16, 2024 |
| INVENTOR(S) | : Junjie Zhao |

It is certified that error appears in the above-identified patent and that said Letters Patent is hereby corrected as shown below:

On the Title Page

Assignee(s) name should read:
--(73) Assignees: BEIJING BOE TECHNOLOGY DEVELOPMENT CO., LTD., Beijing (CN); BOE TECHNOLOGY GROUP CO., LTD., Beijing (CN)--

Signed and Sealed this
Twenty-sixth Day of March, 2024

Katherine Kelly Vidal
*Director of the United States Patent and Trademark Office*